R. B. DISBROW.
COMBINED CHURN AND BUTTER WORKER.
APPLICATION FILED JAN. 12, 1918.

1,274,393.

Patented Aug. 6, 1918.
4 SHEETS—SHEET 1.

Witnesses.
A. H. Opsahl.
H. L. Opsahl.

Inventor.
R. B. Disbrow.
By his Attorneys
Williamson & Merchant

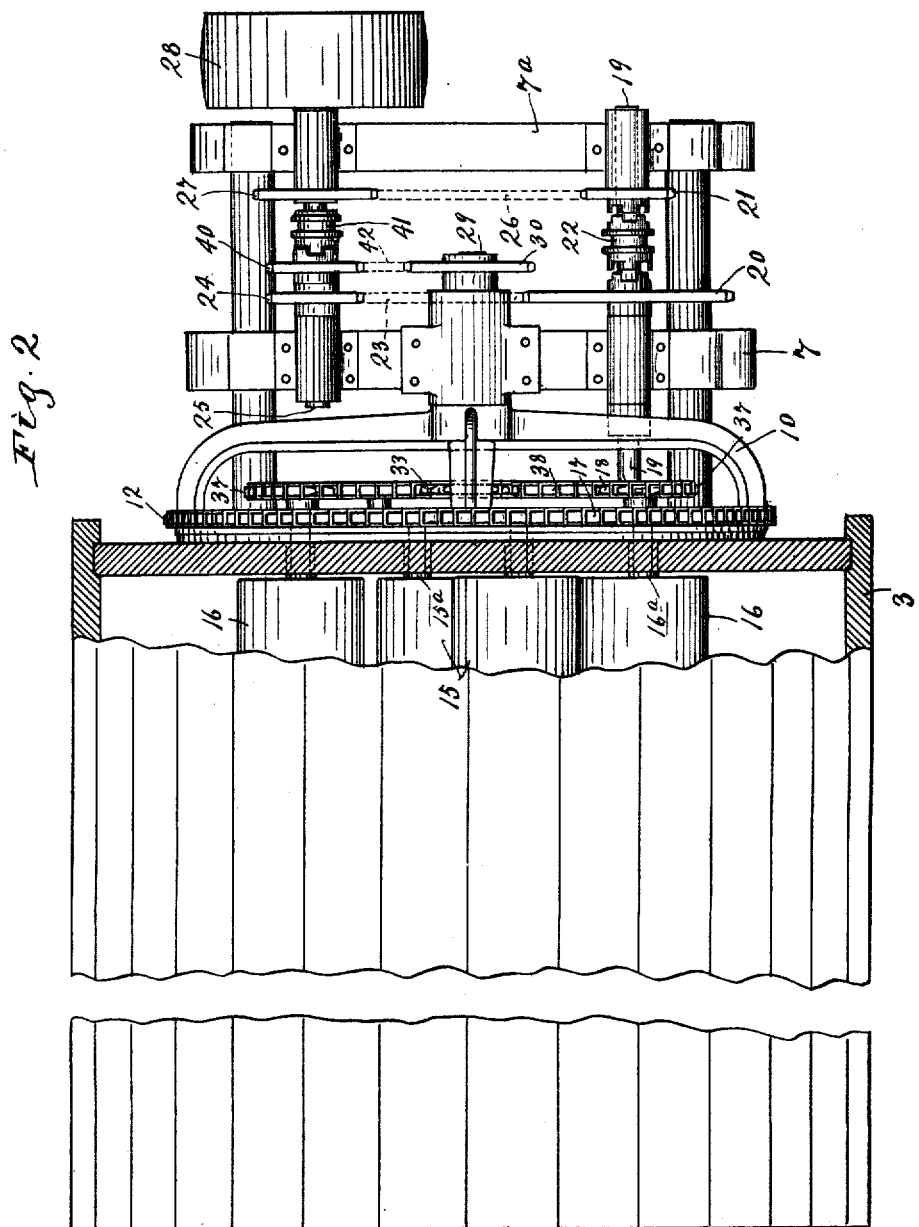

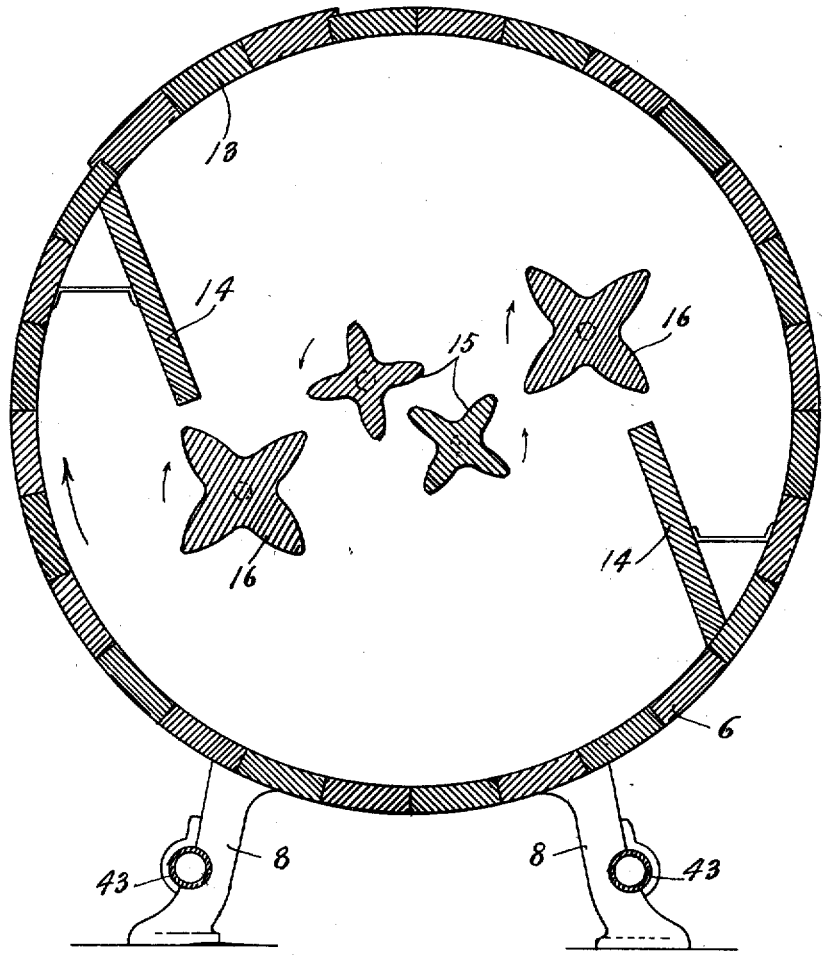

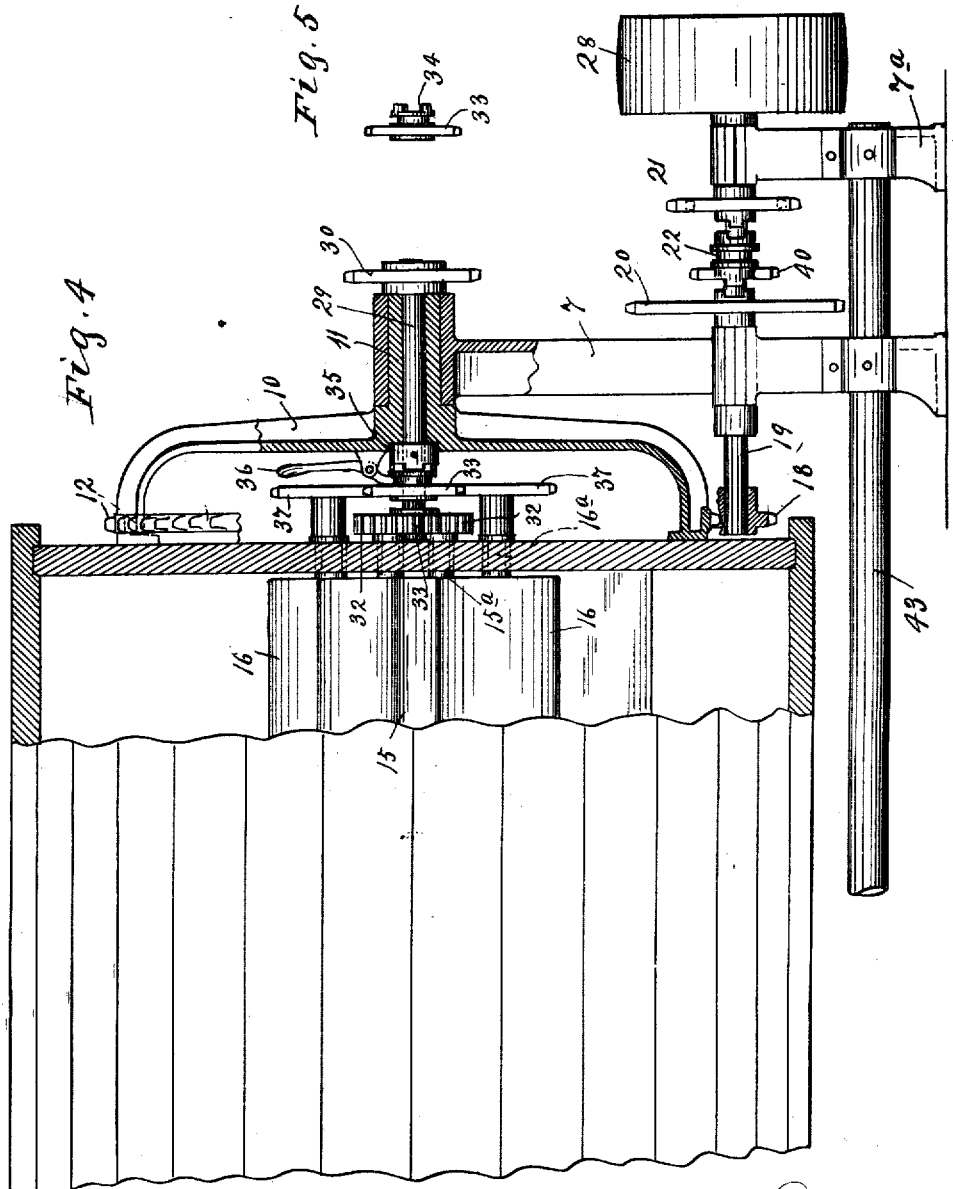

UNITED STATES PATENT OFFICE.

REUBEN B. DISBROW, OF ST. PAUL, MINNESOTA.

COMBINED CHURN AND BUTTER-WORKER.

1,274,393.

Specification of Letters Patent.

Patented Aug. 6, 1918.

Application filed January 12, 1918. Serial No. 211,658.

*To all whom it may concern:*

Be it known that I, REUBEN B. DISBROW, a citizen of the United States, residing at St. Paul, in the county of Ramsey and State of Minnesota, have invented certain new and useful Improvements in Combined Churns and Butter-Workers; and I do hereby declare the following to be a full, clear, and exact description of the invention, such as will enable others skilled in the art to which it appertains to make and use the same.

My invention has for its object to provide an improved combined churn and butter worker, and to such ends, generally stated, the invention consists of the novel devices and combinations of devices hereinafter described and defined in the claims.

The invention is illustrated in the accompanying drawings, wherein like characters indicate like parts throughout the several views. Referring to the drawings, Figure 1 is a front end elevation of the machine;

Fig. 2 shows the machine chiefly in plan but with some parts in horizontal section and with some parts broken away;

Fig. 3 is a transverse vertical section taken through the machine at the longitudinal center of the drum.

Fig. 4 shows the machine chiefly in side elevation but partly in vertical axial section, some parts being broken away; and Fig. 5 is a detail view in plan showing one of the driving sprockets of the driving mechanism.

Figure 1:
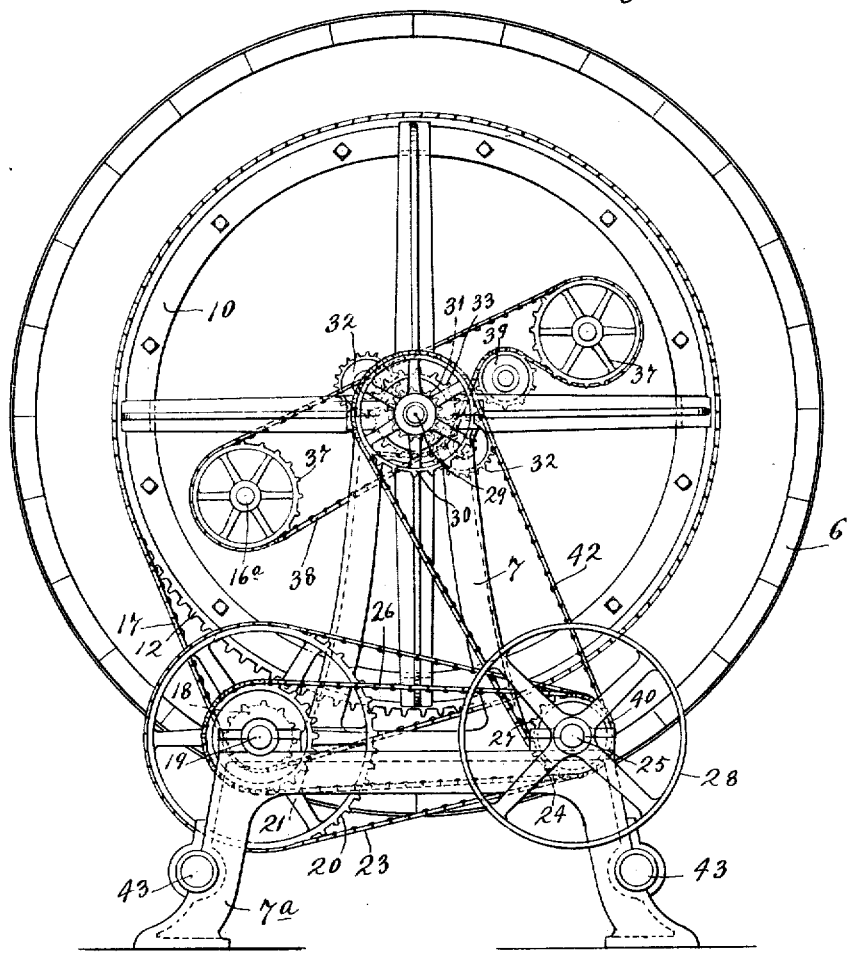

In this combined churn and butter worker, as is customary, the cream and the butter are contained in the long, horizontally disposed rotary drum 6 journaled to suitable front and rear pedestal-like frames 7 and 8. At its rear end, the drum is provided with a trunnion 9 that is directly journaled in the pedestal 8, and secured to the front head of the drum is a spider-like bracket 10 which has an axial bearing sleeve 11 offset from the head of the drum and journaled in the upper portion of the pedestal 7. Located quite close to the front head of the drum and either cast integral with, or otherwise rigidly secured to the inner end portions of the arms of the spider 10, is a large sprocket 12.

The drum 6 is provided with a large peripheral opening that is normally closed by a suitable door 13. Located within the drum and rigidly secured to the heads and shell thereof, is a pair of diametrically opposite reversely projecting shelf-like lifting shelves 14. Working within the drum and journaled to the heads thereof, are two inner working rollers 15 and two outer working rollers 16. All of these rollers are corrugated, that is, formed with a multiplicity of paddle-like blades, preferably, and as shown, four in number. The inner rollers 15 are located equidistant from and on opposite sides of the axis of the drum, and the two outer rollers 16 are located equidistant from and on opposite sides of the axis of the drum, but are much farther from the axis of the drum than are the inner rollers 15. Preferably, also, the outer rollers 16 are larger than the inner rollers. A plane that intersects the axis of the drum and the axes of the outer rollers 16, is oblique to a plane that intersects the axis of the drum and the axes of the inner rollers 15. The working faces of the lifting shelves 14 extend inward from the shell of the drum approximately on lines that intersect the axes of the respective coöperating outer rollers 16. The outermost edges of the blades of the inner rollers 15 move on the lines of intersecting circles so that the blades of the one roller enter the spaces between the blades of the other roller; and, as will presently be noted, these two rollers 15 are geared to revolve as if in mesh, but are held out of contact, the one with the other. The outer edges of the blades of the outer rollers 16 revolve on the lines of cables that come nearly but not quite into tangential contact with the circles described by the outer edges of the coöperating inner rollers 15; and as will also be presently noted, these outer rollers are also geared to rotate in synchronism with the coöperating inner rollers 15 but are driven in reverse directions therefrom. The arrows in Fig. 3 indicate the directions of rotation of the drum and the rollers, and by reference thereto, it will be noted that, as viewed in Fig. 3, the drum and the outer rollers 16 are driven in the same direction, to wit, in a clockwise direction, while the inner rollers 15 are driven in a reverse direction or a direction reverse to clockwise direction as viewed in Fig. 3. This reference to clockwise direction is for illustrative purposes only. The important fact is that the drum and the outer rollers are driven in the same direction and that the inner rollers are driven in a reverse direction so that the adjacent inner and outer rollers will coöperate in pairs and the two pairs of these rollers will be brought into action in succession on the rising side of the drum.

For driving the drum in the direction stated, a sprocket chain 17 is run over the large sprocket wheel 12 and over a relatively very small sprocket wheel 18, which latter is secured to the inner end of a longitudinal counter shaft 19 that is journaled in a suitable bearing on the pedestal 7 and in a suitable bearing on a supplemental pedestal 7ª. Loosely journaled on the shaft 19 between the pedestals 7 and 7ª and laterally spaced, one from the other, is a relatively large sprocket 20 and a relatively smaller sprocket 21. These sprockets on the opposite ends of their hubs are provided with half clutches that are adapted to be engaged by coöperating half clutches formed on the ends of a clutch sleeve 22, which latter is mounted to slide on the shaft 19 but is carried to rotate therewith, by means of a lever not shown. This clutch sleeve 22 may be shifted from a neutral intermediate position, at will, rearward into engagement with the half clutch of the sprocket 20 or forward into engagement with the half clutch of the sprocket 21. A sprocket chain 23 runs over the larger sprocket 20 and over a smaller sprocket 24 that is secured to a driving shaft 25 journaled in suitable bearings on the pedestal 7—7ª. A sprocket chain 26 runs over the sprocket 21 and over a larger sprocket 27 also secured to the counter shaft 25. At its forwardly projected end the counter shaft 25 is shown as provided with a pulley 28 over which a power driven belt, not shown, will run to drive the drum and rollers of the machine.

Journaled in and extended through the axial bearing sleeve 11 of the drum supporting spider 10 is a roller driving counter shaft 29. At its forwardly projected end, this counter shaft 29 is provided with a sprocket 30, and at its rearwardly or inwardly projected end, said counter shaft is provided with an axial spur gear 31 that meshes with similar spur gears 32 secured to the outwardly projected ends of the shafts 15ª of the inner rollers 15.

Keyed to slide upon the inner end of the shaft 29 and to rotate therewith, is an axial driving sprocket 33 shown in detail in Fig. 5 and also indicated in Figs. 1, 3 and 4. The hub of this sprocket 33 is provided with a half clutch 34 that is adapted by a slight lateral movement of said sprocket to be engaged with and disengaged from a coöperating half clutch 35 that is secured to the shaft 29. The above noted movements of the sprocket may be accomplished by a lever 36 (see Fig. 4) pivoted to the spider 10. The shafts 16ª of the outer rollers 16 project through the front head of the drum and are provided with sprockets 37 that are approximately in the plane of the sprocket 33. A sprocket chain 38 runs over the said sprockets 33 and 37 and over an idle sprocket 39 that is journaled to a suitable bearing on the front head of the drum and serves to positively hold the sprocket chain 38 in driving engagement with the axial sprocket 33.

The sprocket 30, on the outer end of the shaft 29 is alined with a sprocket 40 that is loosely journaled on the driving shaft 25 and on its hub is provided with a half clutch that is adapted to be engaged by a clutch sleeve 41 which, in turn, is keyed to rotate with said driving shaft but capable of sliding movements thereon under the action of a suitable shipper lever not shown.

A sprocket chain 42 runs over the sprockets 30 and 40. The pedestals 7, 7ª and 8, at their lower portions, are shown as rigidly tied together by a suitable bar such as metal pipes 43.

Operation: When the clutch sleeve 22 is engaged with the sprocket 21, the drum will be rotated in the direction stated at a relatively high speed required in churning, but when said clutch sleeve is engaged with the sprocket 20 the drum will be driven in the said direction but at a relatively low speed, as required in the butter working action. When the clutch sleeve 41 is disengaged from the sprocket 40, no one of the rollers 15 and 16 will be rotated within the drum, but they will, of course, be carried by the drum, and hence, will coöperate with the shelves 14 to dash the cream in the churning action. The above statement is true whether or not the clutch sleeve 33 is engaged with the clutch member 35 of the shaft 29. Of course, all of the rollers can be driven even in the churning action, but this will, under most all conditions, produce too great agitation of the cream. However, at certain seasons of the year, it is found that the cream will swell in the churning action until it nearly or quite fills the drum, thereby interfering with the proper churning action. With the driving connections described, the outer rollers 16 may be left idle and the central rollers 15 alone driven, this being accomplished when clutch sleeve 41 is engaged with sprocket 40, and clutch 34 of sprocket 33 is disengaged from clutch member 35. Obviously, by the disengagement of the said clutch members 35 and 34, the sprockets 37 of the outer rollers 16 are disconnected from the shaft 29, while the axial gear 31 is always driven with the said shaft 29. When under the above conditions in the churning action, the central rollers 15 are rotated, they will soon whip or beat the cream down to normal condition and greatly hasten the churning action.

For the butter working action, clutch sleeve 22 is engaged with sprocket 20, clutch sleeve 41 is engaged with the sprocket 40 and clutch 34 is engaged with clutch member 35. Then the drum will be rotated at relatively low speed and all of the rollers 15 and 16 will be positively rotated in the direction stated and indicated by arrows in Fig. 3. The rollers 15 and 16, on one side of the axis of the drum coöperate as one pair and the rollers 15 and 16 on the opposite side of the axis of the drum coöperate as another pair. The members of these two pairs of rollers are reversely driven and they operate on the butter on the rising side of the drum. As the butter is raised by the shelf 14 on the rising side of the drum it will be gradually delivered between the upwardly moving pair of rollers 15 and 16 and will be worked downward between the said rollers. This working of the butter will, of course, take place twice for each rotation of the drum which produces a very rapid and thorough working of the butter.

By the described arrangement of the two rollers near the axis of the drum, and the two rollers farther out from the axis of the drum, the rollers are extended in a direction diametrically of the drum over a very considerable area, and at the same time, it is possible to employ rollers, all of which are quite small. This manner of assembling the rollers leaves a maximum of clear space within the drum on the sides thereof that are diametrically opposite to the general line of the rollers. The employment of the comparatively small rollers not only accomplishes the above noted desirable result, but it is, as is well known, a fact that the corrugated or paddle-bladed rollers of small diameter will throw less strain on the driving gears than will larger rollers.

The central rollers are located so close together that the blades of the one will enter the channels of the other, but they are held out of frictional contact by the gears 31 and 32.

After the working of the butter has been completed, it may be gathered up in one mass and properly lifted by the rollers and shelf on the rising side of the drum and then when the door is opened, ready access thereto can be had.

This improved machine has a capacity both for the churning and butter-working actions. In the churning action, it is possible to nearly fill the drum with cream because of the above described action of the central rollers which may be driven in the churning action. The machine in the churning action also because of the described arrangement of the rollers, will handle a large mass of butter and will thoroughly and evenly work the same.

What I claim is:

1. The combination with a horizontally disposed rotary drum, of inner rollers located on opposite sides of the axis of the drum, outer rollers located on opposite sides of the axis of the drum at greater distance from said axis than the said inner rollers, all of said rollers being carried by said drum, and means for rotating said drum and outer rollers in the same direction and the said inner rollers in the opposite direction said inner rollers, in respect to each other, rotating in the same direction and being in such close juxtaposition that the butter cannot pass downward between the same.

2. The combination with a horizontally disposed rotary drum, of two inner rollers journaled to the heads of said drum with their axes equidistant on opposite sides of the axis of said drum, two outer rollers also journaled to the heads of said drum with their axes located equidistant from and on opposite sides of the axis of the drum but a greater distance from the axis of the said drum than said inner rollers, the plane that intersects the axes of said inner rollers being oblique to the plane that intersects the axis of said outer rollers, lifting shelves extending from diametrically opposite points on the interior of the drum toward the adjacent outer rollers, and means for rotating said drum and outer rollers in one direction and said inner rollers in the opposite direction.

3. The combination with a horizontally disposed rotary drum, of inner rollers located on opposite sides of the axis of the drum, outer rollers located on opposite sides of the axis of the drum at greater distance from said axis than said inner rollers, all of said rollers being carried by said drum, and means for rotating said drum and outer rollers in the same direction and the said inner rollers in the opposite direction, the plane that intersects the axes of said inner rollers being oblique to the plane that intersects the axis of said outer rollers.

4. The combination with a horizontally disposed rotary drum, of two inner rollers journaled to the heads of said drum with their axes equidistant on opposite sides of the axis of said drum, two outer rollers also journaled to the heads of said drum with their axes located equidistant from and on opposite sides of the axis of the drum but a greater distance from the axis of the said drum than said inner rollers, the plane that intersects the axes of said inner rollers being oblique to the plane that intersects the axis of said outer rollers, lifting shelves extending from diametrically opposite points on the interior of the drum toward the adjacent outer rollers, and means for rotating said drum and outer rollers in one direction and said inner rollers in the opposite direction, the said rollers having radially projecting blades, the blades of one inner roller working in the channels of the other inner roller.

5. The combination with a horizontally disposed rotary drum, of inner rollers located on opposite sides of the axis of the drum, outer rollers located on opposite sides of the axis of the drum at greater distance from said axis than the said inner rollers, all of said rollers being carried by said drum, and means for rotating said drum and outer rollers in the same direction and the said inner rollers in the opposite direction, the said roller driving means including a clutch whereby said outer rollers may be thrown out of action and the said drum and inner rollers driven.

6. The combination with a horizontally disposed rotary drum, of two inner rollers journaled to the heads of said drum with their axes equidistant on opposite sides of the axis of said drum, two outer rollers also journaled to the heads of said drum with their axes located equidistant from and on opposite sides of the axis of the drum but a greater distance from the axis of the said drum than said inner rollers, the plane that intersects the axes of said inner rollers being oblique to the plane that intersects the axis of said outer rollers, lifting shelves extending from diametrically opposite points on the interior of the drum toward the adjacent outer rollers, and means for rotating said drum and outer rollers in one direction and said inner rollers in the opposite direction, said driving means including a clutch device whereby the drum may be driven and, at will, all of the rollers may be thrown out of action, or the inner rollers may be driven and the outer rollers alone thrown out of action.

In testimony whereof I affix my signature in presence of two witnesses.

REUBEN B. DISBROW.

Witnesses:
CLARA DEMAREST,
F. D. MERCHANT.

Copies of this patent may be obtained for five cents each, by addressing the "Commissioner of Patents. Washington, D. C."